US007274741B2

(12) United States Patent
Ma et al.

(10) Patent No.: US 7,274,741 B2
(45) Date of Patent: Sep. 25, 2007

(54) SYSTEMS AND METHODS FOR GENERATING A COMPREHENSIVE USER ATTENTION MODEL

(75) Inventors: Yu-Fei Ma, Beijing (CN); Lie Lu, Beijing (CN); Hong-Jiang Zhang, Beijing (CN)

(73) Assignee: Microsoft Corporation, Redmond, WA (US)

( * ) Notice: Subject to any disclaimer, the term of this patent is extended or adjusted under 35 U.S.C. 154(b) by 1016 days.

(21) Appl. No.: 10/286,053

(22) Filed: Nov. 1, 2002

(65) Prior Publication Data

US 2004/0088726 A1 May 6, 2004

(51) Int. Cl.
*H04N 7/12* (2006.01)
*G06K 9/46* (2006.01)

(52) U.S. Cl. .......................... 375/240.08; 375/240.16; 382/190

(58) Field of Classification Search ........... 375/240.16, 375/240.08, 240.09; 345/629, 419; 382/190, 382/156, 203; 707/1
See application file for complete search history.

(56) References Cited

U.S. PATENT DOCUMENTS 5,442,633 A 8/1995 Perkins et al.
5,497,430 A * 3/1996 Sadovnik et al. ........... 382/156
5,530,963 A 6/1996 Moore et al.
5,625,877 A 4/1997 Dunn et al.
5,642,294 A 6/1997 Taniguchi et al.
5,659,685 A 8/1997 Williams et al.
5,745,190 A 4/1998 Ioka
5,751,378 A 5/1998 Chen et al.
5,774,593 A 6/1998 Zick et al.
5,801,765 A 9/1998 Gotoh et al.
5,835,163 A 11/1998 Liou et al.
5,884,056 A 3/1999 Steele
5,900,919 A 5/1999 Chen et al.
5,901,245 A 5/1999 Warnick et al.
5,911,008 A 6/1999 Niikura et al.
5,920,360 A 7/1999 Coleman, Jr.
5,952,993 A 9/1999 Matsuda et al.
5,959,697 A 9/1999 Coleman, Jr.
5,983,273 A 11/1999 White et al.
5,990,980 A 11/1999 Golin
5,995,095 A 11/1999 Ratakonda
6,047,085 A 4/2000 Sato et al.

(Continued)

FOREIGN PATENT DOCUMENTS

EP 0597450 5/1994

(Continued)

OTHER PUBLICATIONS

U.S. Appl. No. 10/179,161, filed Jun. 24, 2002; Inventors: Jin-Lin Chen & Wei-Ying Ma entitled "Function-based Object MOdel for Web Page Display in a Mobile Device".

(Continued)

*Primary Examiner*—Gims Philippe
(74) *Attorney, Agent, or Firm*—Lee & Hayes, PLLC

(57) ABSTRACT

Systems and methods to generate an attention model for computational analysis of video data are described. In one aspect, feature components from a video data sequence are extracted. Attention data is generated by applying multiple attention models to the extracted feature components. The generated attention data is integrated into a comprehensive user attention model for the computational analysis of the video data sequence.

32 Claims, 5 Drawing Sheets

U.S. PATENT DOCUMENTS

| | | | | |
|---|---|---|---|---|
| 6,100,941 | A | 8/2000 | Dimitrova et al. | |
| 6,166,735 | A | 12/2000 | Dom et al. | |
| 6,232,974 | B1 * | 5/2001 | Horvitz et al. | 345/419 |
| 6,282,317 | B1 * | 8/2001 | Luo et al. | 382/203 |
| 6,462,754 | B1 | 10/2002 | Chakraborty et al. | |
| 6,466,702 | B1 | 10/2002 | Atkins et al. | |
| 6,622,134 | B1 | 9/2003 | Sorkin | |
| 6,643,643 | B1 | 11/2003 | Lee et al. | |
| 6,643,665 | B2 | 11/2003 | Kimbell et al. | |
| 6,658,059 | B1 | 12/2003 | Iu et al. | |
| 6,670,963 | B2 * | 12/2003 | Osberger | 345/629 |
| 6,714,909 | B1 | 3/2004 | Gibbon et al. | |
| 6,773,778 | B2 | 8/2004 | Onozawa et al. | |
| 6,792,144 | B1 * | 9/2004 | Yan et al. | 382/190 |
| 6,807,361 | B1 | 10/2004 | Girgensohn et al. | |
| 6,934,415 | B2 | 8/2005 | Stentiford | |
| 7,065,707 | B2 | 6/2006 | Chen et al. | |
| 7,116,716 | B2 | 10/2006 | Ma et al. | |
| 2001/0023450 | A1 | 9/2001 | Chu | |
| 2002/0157116 | A1 | 10/2002 | Jasinschi | |
| 2002/0166123 | A1 | 11/2002 | Schrader et al. | |
| 2003/0033347 | A1 | 2/2003 | Bolle et al. | |
| 2003/0152363 | A1 | 8/2003 | Jeannin et al. | |
| 2003/0237053 | A1 | 12/2003 | Chen et al. | |
| 2004/0040041 | A1 | 2/2004 | Crawford et al. | |
| 2004/0068481 | A1 * | 4/2004 | Seshadri et al. | 707/1 |
| 2004/0078357 | A1 | 4/2004 | LaChapelle et al. | |
| 2004/0078382 | A1 | 4/2004 | Mercer et al. | |
| 2004/0078383 | A1 | 4/2004 | Mercer et al. | |
| 2004/0085341 | A1 | 5/2004 | Hua | |
| 2004/0088726 | A1 | 5/2004 | Ma | |
| 2004/0165784 | A1 | 8/2004 | Xie | |

FOREIGN PATENT DOCUMENTS

| | | | |
|---|---|---|---|
| EP | 1 168 840 | A2 | 1/2002 |
| EP | 1 213 915 | A2 | 6/2002 |
| GB | 2 356 080 | A | 5/2001 |
| KR | 20020009089 | A | 2/2002 |
| KR | 20040042449 | A | 5/2004 |
| WO | WO0028467 | A1 | 5/2000 |

OTHER PUBLICATIONS

U.S. Appl. No. 10/285,933, filed Nov. 1, 2002; Inventors: Yu-Fei Ma et al. entitled "Systems and Methods for Generating a Motion Attention Mode".

U.S. Appl. No. 10/286,348, filed Nov. 1, 2002; Inventors Xian-Sheng Hua et al. entitled "Systems and Methods for Automatically Editing a Video".

U.S. Appl. No. 10/371,125, filed Feb. 20, 2003; Inventors: Wei-Ying Ma et al. Entitled "Systems and Methods for Enhanced Image Adaptation".

http://www.fatalfx.com/nomad/ "NOMAD (No More Advertising)" Feb. 17, 2003; 4 pages.

Ahmad Subutai; "VISIT: A Neural Model of Covert Visual Attention" Advances in Neural Information Processing Systems, v. 4, 1991, pp. 420-427.

Baluja et al.; "Expectation-Based Selective Attention for Visual Monitoring and Control of a Robot Vehicle" Robotics and Autonomous Systems, v. 22 No. 3-4, Dec. 1997, pp. 329-344.

Chen et al.; "A Visual Attention Model for Adapting Images on Small Displays" ACM Multimedia Systems Journal, 2003.

Chen, Jinlin et al.; "Function-based Object Model Towards Website Adaptation" Proc. of the 10th Int. WWW Conf., 2001, pp. 1-21.

Cherry Steven M.; "Pesky Home Networks Trouble cable Behemoths" IEEE Spectrum, Apr. 2002, pp. 60-61.

Christopoulos, Charilaos et al.; "The JPEG2000 Still Image Coding System: An Overview" IEEE Transactions on Consumer Electronics, vol. 46 No. 4, Nov. 2000, pp. 1103-1127.

Deng et al.;"Peer Group Filtering and Perceptual Color Image Quantization" Proceedings of IEEE International Symposium on Circuits and Systems, vol. 4, 1999, pp. 21-24.

Divakaran et al; "Video Summarization Using Descriptors of Motion Activity: A Motion Activity Based Approach to Key-Frame Extraction from Video Shots" Journal of Electronic Imaging, Oct. 2001, vol. 10, n 4, pp. 909-916.

Gamaz et al.; "Robust scene-change detection in MPEG compressed domain" Electrical & Computer Engineering, 1998, pp. 95-99.

Gu et al.; "Dissolve Detection in MPEG Compressed Video" IEEE, 1997, pp. 1692-1696.

Hargrove, Thomas; "Logo Detection in Digital Video" Math 100, Mar. 6, 2001 http://toonarchive.com/logo-detection/, 9 pages.

Held, Gibert; "Focus on Agere System's Orinoco PC Card" International Journal of Network Management, Jan. 2002, pp. 187-193.

Heng et al.; "Post Shot Boundary Detection Technique: Flashlight Scene Determination" University of Western Australia, 1999, pp. 447-450.

Jha, Uma S.; "Wireless Landscape-Need for Seamless Connectivity" Wireless Personal Communications 2002 pp. 275-283.

Jing et al.; "An Effective Region-Based Image Retrieval Framework" From ACM Multimedia, 2002, 28 pages.

Lee, Keansub et al.; "Perception-Based Image Transcoding for Universal Multimedia Access" School of Electrical Engineering Korea University, Seoul Korea ,2001, IEEE, pp. 475-478.

Lelescu et al.; "Real-time Scene Change Detection on Compressed Multimedia Bitstream Based on Statistical Sequential Analysis" IEEE, 2000, pp. 1141-1144.

Li et al.; "Statistical Learning of Multi-View Face Detection" Proceedings of ECCV; 2002, 25 pages.

Leinhart, R. et al.; "Detection and Recognition of Television Commercials" University of Mannheim, 17 pages.

Lu, Lie et al.; "A Robust Audio Classification and Segmentation Method" Microsoft Research, China, 9 pages.

Lu, Lie et al.; "Content Analysis for Audio Classification and Segmentation" IEEE Transactions on Speech and Audio Processing, vol. 10 No. 7, Oct. 2002, pp. 504-516.

Lu, Lie et al.; "Content-Based Audio Segmentation Using Support Vector Machines" IEEE, 2001, pp. 956-959.

Ma et al.; "A User Attention Model for Video Summarization" Proceedings of ICIP, 2002.

Milanese R. et al.; "Attentive Mechanisms for Dynamic and Static Scene Analysis" Optical Engineering, v34 no8, Aug. 1995, pp. 2428-2434.

Niebur, E. et al.; "Computational Architectures for Attention" The Attentive Brain, Chapter 9, 1998, pp. 163-186.

O'Toole; "An MPEG-1 Shot Boundary Detector Using XIL Colour Histograms" Dublin City University, 1998, pp. 1-7.

Sadlier, David A.; "Automatic TV Advertisement Detection from MPEG Bitstream" Centre for Digital Video Processing/Research Institute for Network & Communication Eng., Dublin City University, 12 pages.

Sahoo P.K. et al.; "Threshold Selection Using a Minimal Histogram Entropy Difference" Optical Engineering, v36 no7, Jul. 1997, pp. 1976-1981.

Sanchez, Juan Maria; "AudiCom: A Video Analysis System for Auditing Commercial Broadcasts" Computer Vision Center Departament d'Informatica Universitat Autonoma de Barcelona, 5 pages.

Tsotos J. K. et al.; "Modeling Visual Attention Via Selective Tuning" Artificial Intelligence v78 1995 pp. 507-545.

Wolfe J. M. et al.; "Deploying Visual Attention: The Guided Search Model" AI and the Eye, Chapter 4, 1990, pp. 79-103.

Yeo et al.; "Rapid Scene Analysis on Compressed Video" IEEE, 1995, pp. 533-544.

Yusoff et al.; "Video Shot Cut Detection Using Adaptive Thresholding" University of Surrey, 2000, pp. 1-10.

Zabih, Ramin; "A Feature-Based Algorithm for Detecting and Classifying Scene Breaks" Computer Science Department, Cornell University, 16 pages.

Zadeh L. A.; "Probability Measures of Fuzzy Events" Journal of Mathematical Analysis and Applications, 23, 1968, pp. 421-427.

Zhang et al., "A Hierarchical Organization Scheme for Video Data" Pattern Recognition, Elsevier, Kidlington, GB, vol. 35 No. 11, Nov. 2002, pp. 2381-2387.

"Advanced Digital Video Storage and On-line Retrieval System", Advisor Project, Jun. 30, 2002, retrieved from the Internet: http://advisor.matrasi-tls.fr/DUP_workshop_sheet.pdf.

Bertini et al., "Indexing for Resue of TV News Shots" Pattern Recognition, Elsevier, Kidlington, GB, vol. 35, No. 3, Mar. 2002, pp. 581-591.

Lee et al., "Automatic Video Parsing Using Shot Boundary Detection and Camera Operation Analysis" Pattern Recognition, Elsevier, Kidlington, GB, vol. 34, No. 3, Mar. 2001, pp. 711-719.

Divakaran, A., Radhakrishnan, R., Peker, K. A.; "Video Summarization using Descriptors of Motion Activity: A Motion Activity Based Approach to Key-Frame Extraction from Video Shots" Journal of Electronic Imagin, SPIE + IS&T vol. 10, No. 4, Oct. 2001 pp. 909-916.

U.S. Appl. No. 10/285,933, filed Nov. 1, 2002, Inventors Yu-Fei Ma et al., entitled "Systems and Methods for Generating a Motion Attention Model,".

Lee, Keansub et al., "Perception-Based Image Transcoding for Universal Multimedia Access," School of Electrical Engineering Korea University, Seoul, Korea, 2001 IEEE, pp. 475-478.

Christopoulos, Charilaos et al., "The JPEG2000 Still Image Coding System: An Overview," IEEE Transactions on Consumer Electronics, vol. 46, No. 4, pp. 1103-1127, Nov. 2000.

Chen, Jinlin et al., "Function-based Object Model Towards Website Adaptation," (2001) Proc. of the 10th Int. WWW Conf. pp. 1-21.

U.S. Appl. No. 10/179,161, filed Jun. 24, 2002, inventors Jin-Lin Chen & Wei-Ying Ma, entitled "Function-based Object Model for Web Page Display in a Mobile Device,".

U.S. Appl. No. 10/286,348, filed Nov. 1, 2002, inventors Xian-Sheng Hua et al., entitled "Systems and Methods for Automatically Editing a Video,".

M. A. Smith & T. Kanade, "Video Skimming and Characterization through the Combination of Image and Language Understanding Techniques," Proc. of Computer Vision and Pattern Recognition, 1997 IEEE, pp. 775-781.

L. Itti & C. Koch, "Computational Modelling of Visual Attention," Nature Reviews/Neuroscience, vol. 2, Mar. 2001, pp. 1-11.

L. Itti, C. Koch & E. Niebur, "A Model of Saliency-based Visual Attention for Rapid Scene Analysis," IEEE Trans. on Pattern Analysis and Machine Intelligence, 1998, 5 pages.

L. Itti & C. Koch, "A Comparison of Feature Combination Strategies for Saliency-Based Visual Attention Systems," Proc. of SPIE Human Vision and Electronic Imaging IV (HVEI'99), San Jose, CA, vol. 3644, pp. 473-482, Jan. 1999.

Yu-Fei Ma & Hong-Jiang Zhang, "A New Perceived Motion Based Shot Content Representation," Microsoft Research China, 4 pages.

Yu-Fei Ma & Hong-Jiang Zhang, "A Model of Motion Attention for Video Skimming," Microsoft Research Asia, 4 pages.

Colin O'Toole et al., "Evaluation of Automatic Shot Boundary Detection on a Large Video Test Suite," School of Computer Applications & School of Electronic Engineering, Dublin City University, Glasnevin, Dublin, Ireland, Challenge of Image Retrieval, Newcastle, 1999, pp. 1-12.

T. Lin, H.J. Zhang, Q.Y. Shi, "Video Scene Extraction by Force Competition," IEEE Intl. Conference on Multimedia and Expo (ICME 001), Waseda University, Tokyo, Japan, Aug. 22-25, 2001, 4 pages.

Goncalves, "Towards a Learning Model for Feature Integration in Attention Control", retrieved on Jul. 19, 2006 at <<http://ieeexplore.ieee.org/search/srchabstract.jsp?arnumber+1013553&isnumber+21824&pun>>, International Conference on Multisensor Fusion and Integration for Intelligent Systems, Aug. 20-22, 2001, pp. 311-316.

Osberger, et al., "An Automatic Image Quality Assessment Technique Incorporating Higher level Perceptual Factors", retrieved on Jul. 19, 2006, at <<http://ieeexplore.ieee.org/search/srchabstract.jsp?arnumber727227&isnumber==15680&punu>>, International Conference on Image Processing, vol. 3, Oct. 4-7, 1998, pp. 414-418.

Fan, et al., "Visual Attention Based Image Browsing on Mobile Devices" 4 pages.

Adams, et al., "Seeded Region Growing", IEEE, vol. 16, No. 6, 1994, pp. 641-648.

* cited by examiner 120
172
174
Video Adapter
175
Output Peripheral Interface
Network
186
LAN
177
182
189
Remote Applications
WAN
179
180
Modem
178
User Input Interface
170
Keyboard
166
168
150
152
148
146
Data Media Interfaces
154
144
Bus
136
132
Processing Unit
130
134
System Memory
138
(ROM)
BIOS
142
140
(RAM)
Operating System 158
Application Programs
160
Other Program Modules 162
Program Data 164
Operating System
Application Programs
Other Modules
Program Data
158
160
162
164

SYSTEMS AND METHODS FOR GENERATING A COMPREHENSIVE USER ATTENTION MODEL

RELATED APPLICATIONS

This patent application is related to:

U.S. patent application Ser. No. 10/286,933, titled "Systems and Methods for Generating a Motion Attention Model", filed on Nov. 1, 2002, commonly assigned herewith, and which is hereby incorporated by reference.

U.S. patent application Ser. No. 10/286,527, titled "Systems and Methods for Generating a Video Summary", filed on Nov. 1, 2002, commonly assigned herewith, and which is hereby incorporated by reference.

U.S. patent application Ser. No. 10/286,348, titled "Systems and Methods for Automatically Editing a Video", filed on Nov. 1, 2002, commonly assigned herewith, and which is hereby incorporated by reference.

TECHNICAL FIELD

The invention relates to video data analysis. In particular, the invention pertains to identifying elements of video data that are most likely to attract the attention of an observer/listener.

BACKGROUND

There are some techniques used to determine which elements of a visual scene are likely to attract the attention of observers. However, these attention models are limited with respect to predicting which elements are likely to attract attention in a dynamic scene such as a video data sequence that presents multiple visual, audio, and linguistic stimuli over time. This is because such existing techniques are designed to model one attention or another, not model one attention in view of another attention. For instance, the computational visual attention models were developed for static scene analysis or controlling vision system by camera parameters. A comprehensive user attention was not studied concerning visual, audio and linguistic channels of video. Thus, existing attention modeling techniques are substantially limited when applied to video data that consists of a combination of visual, audio, and linguistic information.

The following systems and methods address these and other limitations of conventional techniques to determine which elements of a video data sequence are likely to attract human attention.

SUMMARY

Systems and methods for generating an attention model for computational analysis of video data are described. In one aspect, feature components are extracted from a video data sequence. The extracted feature components are analyzed with multiple attention models to generate attention data. The generated attention data is combined to create a comprehensive user attention model for the computational attention analysis of the video data sequence.

BRIEF DESCRIPTION OF THE DRAWINGS

The detailed description is described with reference to the accompanying figures.

FIG. 8 shows attention degrees of a camera zooming operation.

FIG. 9 is a graph showing attention degrees of a camera zooming operation by a still.

FIG. 10 is a graph showing attention degrees of a camera panning operation.

FIG. 11 is a graph showing a direction mapping function of a camera panning operation.

FIG. 12 is a graph showing attention degrees of a camera panning operation followed by still.

FIG. 13 is a graph showing attention degrees assumed for camera attention modeling of a still and other types of camera motion.

FIG. 14 is a graph showing attention degrees of camera a zooming operation followed by a panning operation.

FIG. 15 is a graph showing attention degrees of a camera panning operation followed by a zooming operation.

FIG. 16 is a graph showing attention degrees for camera attention modeling of a still followed by a zooming operation.

DETAILED DESCRIPTION

Overview

Figure 1:
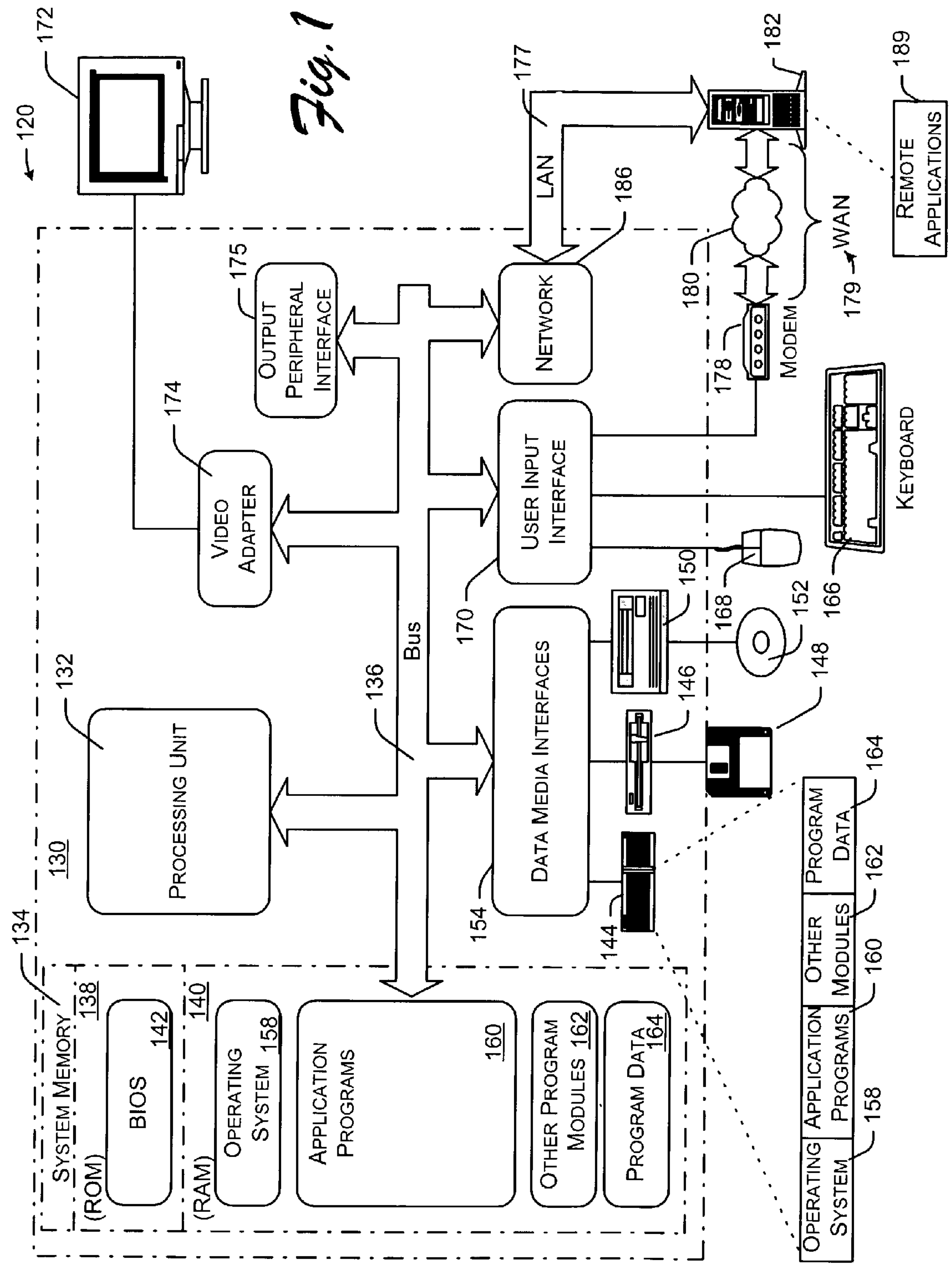
FIG. 1 is a block diagram showing an exemplary computing environment to generate a comprehensive user attention model for attention analysis of a video data sequence.

The following systems and methods are directed to generating a comprehensive user attention model for computational analysis of a video data sequence. As a basic concept, "attention" is considered to be a neurobiological concentration of mental powers upon an object; a close or careful observing or listening, which is the ability or power to concentrate mentally. The computational attention model described below is comprehensive in that it represents such neurobiological concentration by integrating combinations of localized static and dynamic attention models, including different visual, audio, and linguistic analytical algorithms.

The following sections introduce an exemplary operating environment for generating a comprehensive user attention model for attention analysis of a video data sequence. The exemplary operating environment is described in conjunction with exemplary methodologies implemented in a framework of computer-program modules and data flows between the program modules. The comprehensive user attention model generated via this framework can be used to enable and enhance many video data applications that depend on determining which elements of a video data sequence are more likely than others to attract human attention.

An Exemplary Operating Environment

Turning to the drawings, wherein like reference numerals refer to like elements, the invention is illustrated as being implemented in a suitable computing environment. Although not required, the invention will be described in the general context of computer-executable instructions, such as program modules, being executed by a personal computer. Program modules generally include routines, programs, objects, components, data structures, etc., that perform particular tasks or implement particular abstract data types.

FIG. 1 is a block diagram showing an exemplary computing environment 120 on which the described systems, apparatuses and methods may be implemented. Exemplary computing environment 120 is only one example of a suitable computing environment and is not intended to suggest any limitation as to the scope of use or functionality of systems and methods described herein. Neither should computing environment 120 be interpreted as having any dependency or requirement relating to any one or combination of components illustrated in computing environment 120.

The methods and systems described herein are operational with numerous other general purpose or special purpose computing system environments or configurations. Examples of well known computing systems, environments, and/or configurations that may be suitable include, but are not limited to, including hand-held devices, multi-processor systems, microprocessor based or programmable consumer electronics, network PCs, minicomputers, mainframe computers, portable communication devices, and the like. The invention may also be practiced in distributed computing environments where tasks are performed by remote processing devices that are linked through a communications network. In a distributed computing environment, program modules may be located in both local and remote memory storage devices.

As shown in FIG. 1, computing environment 120 includes a general-purpose computing device in the form of a computer 130. The components of computer 130 may include one or more processors or processing units 132, a system memory 134, and a bus 136 that couples various system components including system memory 134 to processor 132.

Bus 136 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus also known as Mezzanine bus.

Computer 130 typically includes a variety of computer readable media. Such media may be any available media that is accessible by computer 130, and it includes both volatile and non-volatile media, removable and non-removable media. In FIG. 1, system memory 134 includes computer readable media in the form of volatile memory, such as random access memory (RAM) 140, and/or non-volatile memory, such as read only memory (ROM) 138. A basic input/output system (BIOS) 142, containing the basic routines that help to transfer information between elements within computer 130, such as during startup, is stored in ROM 138. RAM 140 typically contains data and/or program modules that are immediately accessible to and/or presently being operated on by processor 132.

Computer 130 may further include other removable/non-removable, volatile/non-volatile computer storage media. For example, FIG. 1 illustrates a hard disk drive 144 for reading from and writing to a non-removable, non-volatile magnetic media (not shown and typically called a "hard drive"), a magnetic disk drive 146 for reading from and writing to a removable, non-volatile magnetic disk 148 (e.g., a "floppy disk"), and an optical disk drive 150 for reading from or writing to a removable, non-volatile optical disk 152 such as a CD-ROM/R/RW, DVD-ROM/R/RW/+R/RAM or other optical media. Hard disk drive 144, magnetic disk drive 146 and optical disk drive 150 are each connected to bus 136 by one or more interfaces 154.

The drives and associated computer-readable media provide nonvolatile storage of computer readable instructions, data structures, program modules, and other data for computer 130. Although the exemplary environment described herein employs a hard disk, a removable magnetic disk 148 and a removable optical disk 152, it should be appreciated by those skilled in the art that other types of computer readable media which can store data that is accessible by a computer, such as magnetic cassettes, flash memory cards, digital video disks, random access memories (RAMs), read only memories (ROM), and the like, may also be used in the exemplary operating environment.

A number of program modules may be stored on the hard disk, magnetic disk 148, optical disk 152, ROM 138, or RAM 140, including, e.g., an operating system 158, one or more application programs 160, other program modules 162, and program data 164. The systems and methods described herein to generate a comprehensive user attention model for analyzing attention in a video data sequence may be implemented within operating system 158, one or more application programs 160, other program modules 162, and/or program data 164. A number of exemplary application programs and program data are described in greater detail below in reference to FIG. 2.

A user may provide commands and information into computer 130 through input devices such as keyboard 166 and pointing device 168 (such as a "mouse"). Other input devices (not shown) may include a microphone, joystick, game pad, satellite dish, serial port, scanner, camera, etc. These and other input devices are connected to the processing unit 132 through a user input interface 170 that is coupled to bus 136, but may be connected by other interface and bus structures, such as a parallel port, game port, or a universal serial bus (USB).

A monitor 172 or other type of display device is also connected to bus 136 via an interface, such as a video adapter 174. In addition to monitor 172, personal computers typically include other peripheral output devices (not shown), such as speakers and printers, which may be connected through output peripheral interface 175.

Computer 130 may operate in a networked environment using logical connections to one or more remote computers, such as a remote computer 182. Remote computer 182 may include many or all of the elements and features described herein relative to computer 130. Logical connections shown in FIG. 1 are a local area network (LAN) 177 and a general wide area network (WAN) 179. Such networking environments are commonplace in offices, enterprise-wide computer networks, intranets, and the Internet.

When used in a LAN networking environment, computer 130 is connected to LAN 177 via network interface or adapter 186. When used in a WAN networking environment, the computer typically includes a modem 178 or other means for establishing communications over WAN 179. Modem 178, which may be internal or external, may be connected to system bus 136 via the user input interface 170 or other appropriate mechanism.

Depicted in FIG. 1, is a specific implementation of a WAN via the Internet. Here, computer 130 employs modem 178 to establish communications with at least one remote computer 182 via the Internet 180.

In a networked environment, program modules depicted relative to computer 130, or portions thereof, may be stored in a remote memory storage device. Thus, e.g., as depicted in FIG. 1, remote application programs 189 may reside on a memory device of remote computer 182. It will be appreciated that the network connections shown and described are exemplary and other means of establishing a communications link between the computers may be used.

Figure 2:
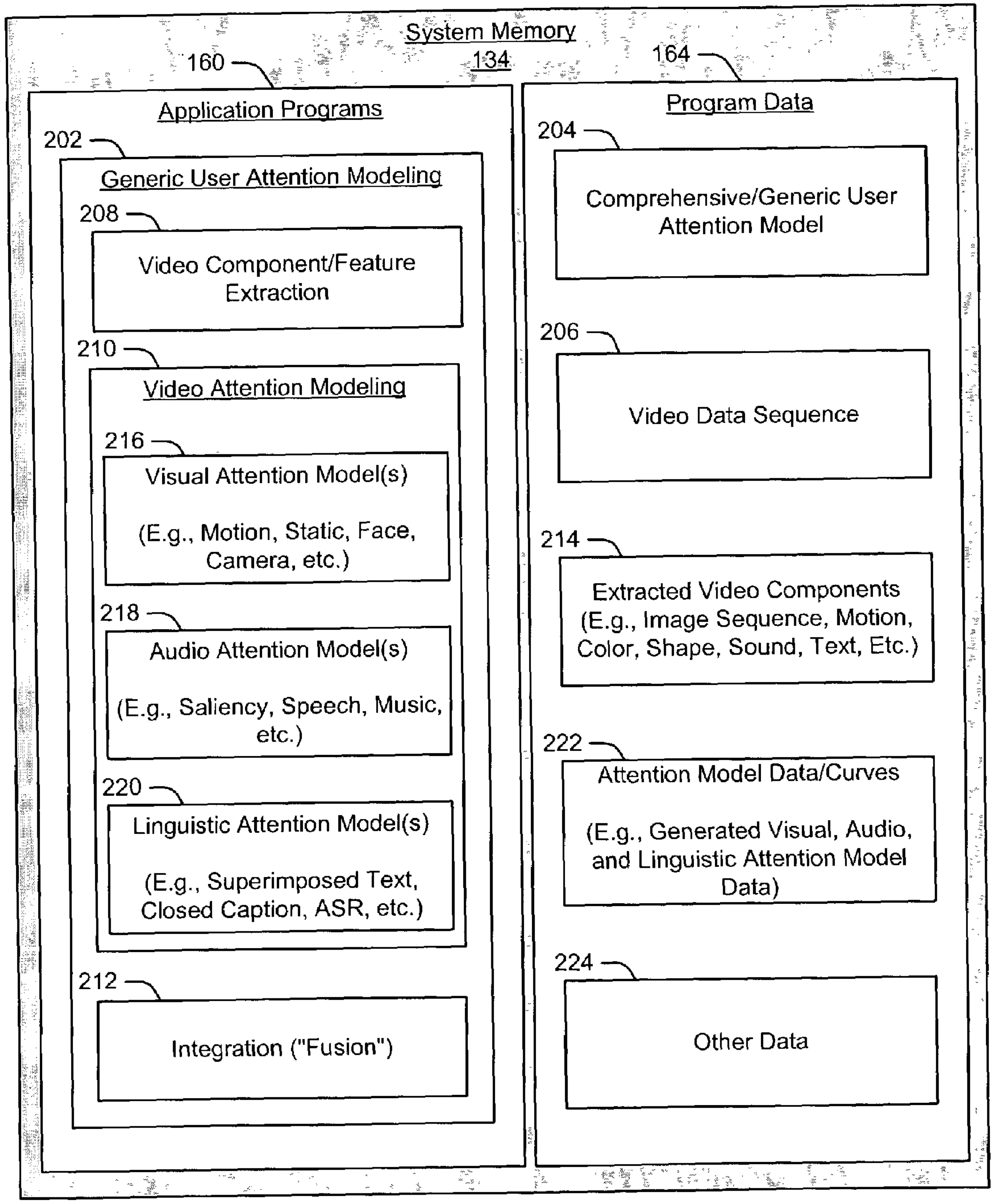
FIG. 2 shows an exemplary computer-program module framework to generate a comprehensive user attention model for attention analysis of a video data sequence.

FIG. 2 is a block diagram that shows further exemplary aspects of application programs 160 and program data 164 of the exemplary computing device 130 of FIG. 1. In particular, system memory 134 includes, for example, generic user attention modeling module 202. The generic attention modeling module creates comprehensive user attention model 204 from video data sequence 206. The comprehensive attention model is also considered to be a "generic" because it is based on combined characteristics of multiple different attention models, rather than just being based on a single attention model. In light of this, the comprehensive user attention model is often referred to as being generic.

Generic attention modeling module 202 includes video component/feature extraction module 208. The video component extraction module extracts video components 214 from video data sequence 206. The extracted components include, for example, image sequence, audio track, and textual features. From image sequence, motion (object motion and camera motion), color, shape, texture, and/or text region(s) features are determined. Speech, music, and/or other various special sounds are extracted from the video's audio channel. Text-related information is extracted from linguistic data sources such as from closed caption, automatic speech recognition (ASR), and superimposed text data sources.

Video attention modeling module 210 applies various visual, audio, and linguistic attention modeling modules 216-220 to the extracted video features 214 to generate attention data 222. For instance, the visual attention module 216 applies motion, static, face, and/or camera attention models to the extracted features. The audio attention module 218 applies, for example, saliency, speech, and/or music attention models to the extracted features. The linguistic attention module 220 applies, for example, superimposed text, automatic speech recognition, and/or closed caption attention models to the extracted features. Along this line, the generated attention data includes, for example, motion, static, face, camera saliency, speech, music, superimposed text, closed captioned text, and automated speech recognition attention information.

The modeling components that are utilized in video attention modeling module 210 can be considerably customized to apply different combinations of video, audio, and linguistic attention models to extracted video components 214. As long as an attention model (e.g., video, audio, or linguistic) is available to generate the attention data, the attention model can be used in the described system of FIG. 1. These different combinations can be designed to meet multiple video data analysis criteria. In this manner, the video attention modeling module has an extensible configuration.

Integration module 206 of FIG. 2 integrates attention data 222, which represents data from multiple different visual, audio, and linguistic attention models, to generate the comprehensive user attention model 204. In this implementation, the generated attention models are integrated with a linear combination, although other techniques such as user integration and/or learning systems could be used to integrate the data. To integrate the attention data via linear combination, the data for each respective attention model is normalized to [0~1].

For instance, let A denote the comprehensive user attention model 204 computed as follows:

$$A=w_v\cdot\overline{M_v}+w_a\cdot\overline{M_a}+w_l\cdot\overline{M_l} \quad (1).$$

In equation (1), $w_v$, $w_a$, $w_l$ are the weights for linear combination, and $\overline{M_v}$, $\overline{M_a}$, and $\overline{M_l}$ are normalized visual, audio, and linguistic attention models, respectively, which are defined as follows:

$$M_v=\left(\sum_{i=1}^{p} w_i\cdot\overline{M_i}\right)\times\left(\overline{M}_{cm}\right)^{S_{cm}} \quad (2)$$

$$M_a=\left(\sum_{j=1}^{q} w_j\cdot\overline{M_j}\right)\times\left(\overline{M}_{as}\right)^{S_{as}} \quad (3)$$

$$M_l=\sum_{k=1}^{r} w_k\cdot\overline{M_k} \quad (4)$$

where $w_i$, $w_j$, $w_k$ are weights in visual, audio, and linguistic attention models respectively. If any one model is not weighted, it is set to zero (0). $\overline{M_i}$, $\overline{M_j}$ and $\overline{M_k}$ are the normalized attention model components in each attention model. $\overline{M_{cm}}$ is the normalized camera attention, which is used as visual attention model's magnifier. $S_{cm}$ works as the switch of magnifier. If $S_{cm}$>=1, the magnifier is open turned on; while $S_{cm}$=0, the magnifier is closed turned off. The higher the $S_{cm}$ value is, the more powerful the magnifier. Similar to camera attention, $\overline{M_a}$ normalized audio saliency attention, which is also used as a magnifier of audio attention. As magnifiers, $M_{cm}$ and $M_{as}$ are all normalized to [0~2]. In the definition of attention models (1~4), all weights are used to control the user's preference to the corresponding channel. These weights can be adjusted automatically or interactively.

Since the system illustrated by FIGS. 1 and 2 is extensible, any computational visual, audio, or linguistic attention model can be integrated into the framework of the video attention modeling module 210. In this detailed description, modeling methods of some of the most salient audio-visual features are discussed to demonstrate the effectiveness of the described comprehensive user attention model and its application to video summarization. Details of each of the attention modeling methods, with the exception of the linguistic attention model, are presented in the following sections. In this implementation, the linguistic attention model(s) are based on one or more known natural language processing techniques, such as key word frequency, central topic detection, and so on.

Visual Attention Modeling

This section describes exemplary operations of visual attention modeling module 216 to generate the visual attention data portion of attention data 222. In an image sequence, there are many visual features, including motion, color, texture, shape, text region, etc. All these features can be classified into two classes: dynamic and static features. Additionally, certain recognizable objects, such as face, will more likely attract human attention. Moreover, camera operations are often used to induce reviewer's attention. In view of this, visual attention models are used to model the visual effects due to motion, static, face, and camera attention, each of which are now described.

Motion Attention Modeling

The motion attention model is based motion fields extracted from video data sequence 206 (FIG. 2). Motion fields or descriptors include, for example, motion vector fields (MVFs), optical flow fields, macro-blocks (i.e., a block around a pixel in a frame), and so on. For a given frame in a video sequence, we extract the motion field between the current and the next frame and calculate a set of motion characteristics. In this implementation, video sequences, which include audio channels, are stored in a compressed data format such as the MPEG data format. MVFs are readily extracted from MPEG data. The motion attention model of this implementation uses MVFs, although any other motion field or descriptor may also be used to implement the described motion attention model.

If a MVF is considered to be analogous to a retina in an eye, the motion vectors represent a perceptual response of optic nerves. An MVF has three inductors: an Intensity Inductor, a Spatial Coherence Inductor, and a Temporal Coherence Inductor. When the motion vectors in the MVF go through such inductors, they will be transformed into three corresponding maps. These normalized outputs of inductors are fused into a saliency map by linear combination, as discussed below in reference to equation (10). In this way, the attended regions (regions on which a human will focus/pay attention) can be detected from saliency map image by image processing methods.

Three inductors are calculated at each location of macro block $MB_{ij}$. The Intensity Inductor induces motion energy or activity, called motion intensity I, and is computed, namely, as the normalized magnitude of motion vector, $$I(i,\ j) = \sqrt{dx_{i,j}^2 + dy_{i,j}^2}\ \Big/ \mathrm{Max}Mag \tag{5}$$

where ($dx_{ij}$, $dy_{ij}$) denote two components of motion vector, and MaxMag is the maximum magnitude in a MVF.

The Spatial Coherence Inductor induces the spatial phase consistency of motion vectors. Regions with consistent motion vectors have high probability to be in one moving object. In contrast, regions with inconsistent motion vectors are more likely located at the boundary of objects or in still background. Spatial coherency is measured using a method as described in "A New Perceived Motion based Shot Content Representation", by Y. F. Ma and H. J. Zhang, published in 2001, and hereby incorporated by reference. First a phase histogram is computed in a spatial window with the size of w×w (pixels) at each location of a macro block. Then, the phase distribution is measured by entropy as follows:

$$Cs(i,\ j) = -\sum_{t=1}^{n} p_s(t)\mathrm{Log}(p_s(t)) \tag{6}$$

$$p_s(t) = SH_{i,j}^w(t) \Big/ \sum_{k=1}^{n} SH_{i,j}^w(k) \tag{7}$$

where $SH^w_{ij}(t)$ is the spatial phase histogram whose probability distribution function is $p_s(t)$, and n is the number of histogram bins.

Similar to spatial coherence inductor, temporal coherency is defined as the output of Temporal Coherence Inductor, in a sliding window of size L (frames) along time axis, as:

$$Ct(i,\ j) = -\sum_{t=1}^{n} p_t(t)\mathrm{Log}(p_t(t)) \tag{8}$$

$$p_t(t) = TH_{i,j}^L(t) \Big/ \sum_{k=1}^{n} TH_{i,j}^L(k) \tag{9}$$

where $TH^L_{ij}(t)$ is the temporal phase histogram whose probability distribution function is $p_t(t)$, and n is the number of histogram bins.

In this way, motion information from three channels I, Cs, Ct is obtained. In combination this motion information composes a motion perception system. Since the outputs from the three inductors, I, Cs, and Ct, characterize the dynamic spatio-temporal attributes of motion in a particular way, motion attention is defined as:

$$B = I \times Ct \times (1 - I \times Cs) \tag{10}$$

By (10), the outputs from I, Cs, and Ct channels are integrated into a motion saliency map in which the motion attention areas can be identified precisely.

Figures 3, 4, 5, 6, 7:
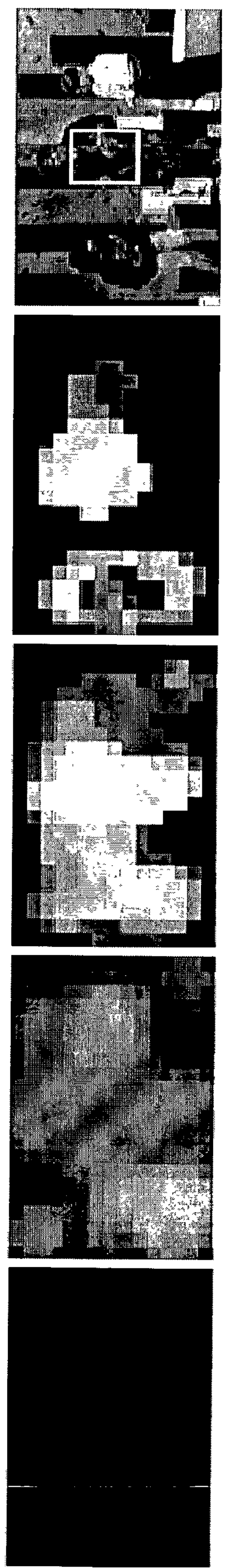
FIG. 3 represents a map of motion attention detection with an intensity inductor or I-Map.
FIG. 4 represents a map of motion attention detection with a spatial coherence inductor or Cs-Map.
FIG. 5 represents a map of motion attention detection with a temporal coherence inductor or Ct-Map.
FIG. 6 represents a map of motion attention detection with a saliency map.
FIG. 7 represents a video still or image, wherein a motion attention area is marked by a rectangular box.

FIGS. 3-6 represent exemplary maps of motion attention detection with respect to areas of motion in an original exemplary image of FIG. 7. In particular: FIG. 3 represents a map of motion attention detection with an I-Map; FIG. 4 represents a map of motion attention detection with a Cs-Map; FIG. 5 represents a map of motion attention detection with a Ct-Map; FIG. 6 represents a map of motion attention detection with a saliency map; and FIG. 7 represents the original image in which a motion attention area is marked by a rectangular box. Note that the saliency map of FIG. 6 precisely detects the areas of motion with respect to the original image of FIG. 7.

To detect salient motion attention regions as illustrated by the exemplary saliency map of FIG. 6, the following image processing procedures are employed: (a) histogram balance; (b) median filtering; (c) binarization; (d) region growing; and (e) region selection. With the results of motion attention detection, the motion attention model is calculated by accumulating the brightness of the detected motion attention regions in saliency map as follows:

$$M_{motion} = \left(\sum_{r\in\Lambda}\sum_{q\in\Omega_r} B_q\right) \Big/ N_{MB} \tag{11}$$

where $B_q$ is the brightness of a macro block in saliency map, $\Lambda$ is the set of detected areas with motion attention, $\Omega_r$ denotes the set of macro blocks in each attention area, and $N_{MB}$ is the number of macro blocks in a MVF which is used for the normalization purpose. The $M_{motion}$ value of each frame in a video sequence then forms a continuous motion attention curve along the time axis.

Static Attention Modeling

While motion attention modeling can reveal most of attentions in video, motion attention modeling has limitations. For instance, a static background region may attract human attention; even through there is no motion in the static background. In light of this deficiency, a static attention model is applied to the video data sequence 206 for subsequent integration into the comprehensive user attention model 204.

A saliency-based visual attention model for static scene analysis is described in a paper titled "Computational Modeling of Visual Attention", by Itti and Koch, published in March 2001, which is hereby incorporated by reference. This work is directed to finding attention focal points with respect to a static image. This work is completely silent with respect to solving any attention model for dynamic scene analysis such as that found in video. In view of this limitation, a static attention model is described to generate a time-serial attention model or curve from individual saliency maps for attention modeling of dynamic scenes by the attention model framework of FIGS. 1 and 2. As described below, the time-serial attention curve consists of multiple binarized static attention models that have been combined/aggregated with respect to time to model attention of a dynamic video sequence.

A saliency map is generated from each frame of video data by the three (3) channel saliency maps to determine color contrasts, intensity contrasts, and orientation contrasts. Techniques to make such determinations are described in "A Model of Saliency-Based Visual Attention for Rapid Scene Analysis" by Itti et al., IEEE Trans. On Pattern Analysis and Machine Intelligence, 1998, hereby incorporated by reference.

Subsequently, a final saliency map is generated by applying portions of the iterative method proposed in "A Comparison of Feature Combination Strategies for Saliency-Based Visual Attention Systems, Itti et al, Proc. Of SPIE Human Vision and Electronic Imaging IV (HVEI'99), San Jose, Calif., Vol. 3644, pp. 473-82, January 1999, hereby incorporated by reference. However, rather than locating human's focus of attention orderly, regions that are most attractive to human attention are detected by binarizing the saliency map. The size, the position and the brightness attributes of attended regions in the binarized or gray saliency map decide the degree of human attention attracted. The binarization threshold is estimated in an adaptive manner.

Threshold estimation is represented as follows:

$$T=\mu+\alpha\sigma,$$

where T denotes threshold, $\mu$ is mean, and $\sigma$ is variance. $\alpha$=3, which is a consistent value.

Accordingly, the static attention model is defined based on the number of attended regions and their position, size and brightness in a binarized saliency map as follows:

$$M_{static} = \frac{1}{A_{frame}} \sum_{k=1}^{N} \sum_{(i,j)\in R_k} B_{i,j} \cdot w_{pos}^{i,j} \quad (12)$$

where $B_{ij}$ denotes the brightness of the pixels in saliency regions $R_k$, N denotes the number of saliency regions, $A_{frame}$ is the area of frame, and $W_{pos}^{ij}$ is a normalized Gaussian template with the center located at the center of frame. Since a human usually pays more attention to the region near to the center of a frame, a normnalized Gaussian template is used to assign a weight to the position of the saliency regions.

Face Attention Modeling

A person's face is generally considered to be one of the most salient characteristics of the person. Similarly, a dominant animal's face in a video could also attract viewer's attention. In light of this, it follows that the appearance of dominant faces in video frames will attract a viewers' attention. In view of this, a face attention model is applied to the video data sequence 206 by the visual attention modeling module 216. Data generated as a result is represented via attention data 222, which is ultimately integrated into the comprehensive user attention model 204.

By employing a real time human face detection attention model, the visual attention modeling module 216, for each frame, obtains face animation information. Such information includes the number of faces, and their respective poses, sizes, and positions. A real-time face detection technique is described in "Statistical Learning of Multi-View Face Detection", by Li et al., Proc. of EVVC 2002; which is hereby incorporated by reference. In this implementation, seven (7) total face poses (with out-plane rotation) can be detected, from the frontal to the profile. The size and position of a face usually reflect the importance of the face.

In view of this, face attention is modeled as $$M_{face} = \sum_{k=1}^{N} \frac{A_k}{A_{frame}} \times \frac{w_{pos}^{i}}{8} p \quad (13)$$

where $A_k$ denotes the size of $k^{th}$ face in a frame, $A_{frame}$ denotes the area of frame, $w_{pos}^{i}$ is the weight of position defined in FIG. 4(*b*), and $i\epsilon[0,8]$ is the index of position. With this face attention model, we may calculate face attention value at each frame to generate face attention curve.

Camera Attention Modeling

Camera motion is typically utilized to guide viewers' attentions, emphasizing or neglecting certain objects in a segment of video. In view of this, camera motions are also very useful for formulating the comprehensive user attention model 204 for analyzing video data sequence 206.

Generally speaking, if we let the z- axis go through the axes of lens, and be perpendicular to the image plane x-y, camera motion can be classified into the following types: (a) Panning and tilting, resulted from camera rotations around the x- and y-axis, respectively, both referred as panning in this paper; (b) Rolling, resulted from camera rotations around the z-axis; (c) Tracking and booming, resulted from camera displacement along x- and y-axis, respectively, both referred as tracking in this paper; (d) Dollying, resulted from camera displacement along z-axis; (e) Zooming (In/Out), resulted from lens' focus adjustment; and (f) Still.

By using the affine motion estimation, the camera motion type and speed is accurately determined. However, the challenge is how to map these parameters to the effect they have in attracting the viewer's attention. We derive the camera attention model based on some general camera work rules.

First, the attention factors caused by camera motion are quantified to the range of [0~2]. In the visual attention definition (2), camera motion model is used as a magnifier, which is multiplied with the sum of other visual attention models. A value higher than one (1) means emphasis, while a value smaller than one (1) means neglect. If the value is equal to one (1), the camera does not intend to attract human's attention. If we do not want to consider camera motion in visual attention model, it can be closed by setting the switch coefficient $S_{cm}$ to zero (0).

Then, camera attention is modeled based on the following assumptions:

- Zooming and dollying are typically used to emphasize something. The faster the zooming/dollying speed, the more important the content focused is. Usually, zoom-in or dollying forward is used to emphasize the details, while zoom-out or dollying backward is used to emphasize an overview scene. For purposes of this implementation of camera attention modeling, dollying is treated the same as zooming.
- If a video producer wants to neglect something, horizontal panning is applied. The faster the speed is, the less important the content is. On the contrary, unless a video producer wants to emphasize something, vertical panning is not used since it bring viewers unstable feeling. The panning along other direction is more seldom used which is usually caused by mistakes.
- Other camera motions have no obvious intention and are assigned a value of one (1). In this case, the attention determination is left to other visual attention models.
- If the camera motion changes too frequently, it is considered to be random or unstable motion. This case is also modeled as one (1).

FIGS. 8-16 show exemplary aspects of camera attention modeling used to generate a visual attention data aspects of the attention data 222 of FIG. 2. The assumptions discussed in the immediately preceding paragraph are used to generate the respective camera motion models of FIGS. 8-16.

Figure 8:
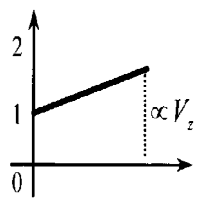
FIGS. 8-16 show exemplary aspects of camera attention modeling used to generate a visual attention model. In particular.
Figure 9:
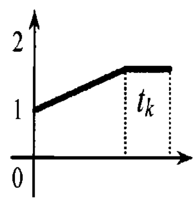

For example, FIGS. 8 and 9 illustrate an exemplary camera attention model for a camera zooming operation. The model emphasizes the end part of a zooming sequence. This means that the frames generated during the zooming operation are not considered to be very important, and frame importance increases temporally when the camera zooms. As shown in FIG. 8, the attention degree is assigned to one (1) when zooming is started, and the attention degree of the end part of the zooming is direct ratio to the speed of zooming $V_z$. If a camera becomes still after a zooming, the attention degree at the end of the zooming will continue for a certain period of time $t_k$, and then return to one (1), as shown in FIG. 9.

Figure 10:
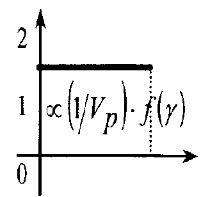
Figure 11:
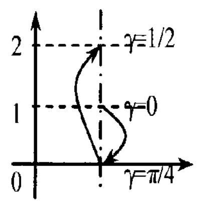
Figure 12:
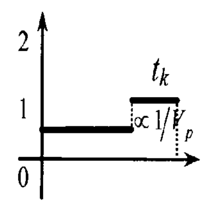

FIGS. 10-12 respectively illustrate that the attention degree of panning is determined by two aspects: the speed $V_p$ and the direction $\gamma$. The attention can be modeled as the product of the inverse of speed and the quantization function of direction as shown in FIG. 10. Taking the first quadrant as an example in FIG. 11, motion direction $\gamma \in [0 \sim \pi/2]$ is mapped to [0~2] by a subsection function. Zero (0) is assigned to direction $\gamma=\pi/4$, one (1) is assigned to direction $\gamma=0$, and two (2) is assigned to direction $\gamma=\pi/2$. The first section is monotonously decreasing while the second section is monotonously increasing. Similar to zooming, if the camera becomes still after a panning, the attention degree will continue for a certain period of time $t_k$, and the attention degree will be only inverse ratio to the speed of panning $V_p$ as shown in FIG. 12.

Figure 13:
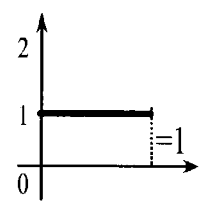
Figure 14:
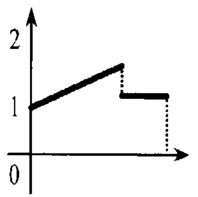

FIG. 13 is a graph showing attention degrees assumed for camera attention modeling of still (no motion) and "other types" of camera motion. Note that the model of other types of camera motions is the same as for a still camera, which is/are modeled as a constant value one (1). FIG. 14 is a graph showing attention degrees of camera a zooming operation(s) followed by a panning operation(s). If zooming is followed by a panning, they are modeled independently. However, if other types of motion are followed by a zooming, the start attention degree of zooming is determined by the end of these motions.

Figure 15:
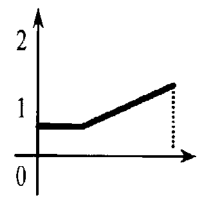
Figure 16:
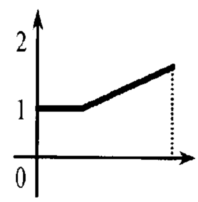

FIGS. 15 and 16 show examples of the zooming followed by panning and still respectively. In particular, FIG. 15 is a graph showing attention degrees of a camera panning operation(s) followed by a zooming operation(s). FIG. 16 is a graph showing attention degrees for camera attention modeling of a still followed by a zooming operation, which is also an example of a camera motion attention curve.

Audio Attention Modeling

Audio attention modeling module 218 generates audio attention data, which is represented via attention data 222, for integration into the comprehensive user attention model 204 of FIG. 2. Audio attentions are the important parts of user attention model framework. Speech and music are semantically meaningful for human beings. On the other hand, loud and sudden sound effects typically grab human attention. In light of this, the audio attention data is generated using three (3) audio attention models: audio saliency attention, speech attention, and music attention.

Audio Saliency Attention Model

Many characteristics can be used to represent audio saliency attention model. However, a substantially fundamental characteristic is loudness. Whether the sound is speech, music, or other special sound (such as whistle, applause, laughing, and explosion), people are generally attracted by the louder or sudden sound if they have no subjective intention. Since loudness can be represented by energy, audio saliency attention is modeled based on audio energy. In general, people may pay attention to an audio segment if one of the following cases occurs. One is the audio segment with absolute loud sound, which can be measured by average energy of an audio segment. The other is the loudness of audio segment being suddenly increased or deceased, which is measured by energy peak.

Such sharp increases or decreases are measured by energy peak. Hence, the audio saliency model is defined as:

$$M_{as}=\overline{E_a}\cdot\overline{E_p} \qquad (14)$$

where $\overline{E_a}$ and $\overline{E_p}$ are the two components of audio saliency: normalized average energy and normalized energy peak in an audio segment. They are calculated as follows respectively.

$$\overline{E_a}=E_{avr}/\mathrm{Max}E_{avr} \qquad (15)$$

$$\overline{E_p}E_{peak}/\mathrm{Max}E_{peak} \qquad (16)$$

where $E_{avr}$ and $E_{peak}$ denote the average energy and energy peak of an audio segment, respectively. $MaxE_{avr}$ and $MaxE_{peak}$ are the maximum average energy and energy peak of an entire audio segment corps. A sliding window is used to compute audio saliency along an audio segment. Similar to camera attention, audio saliency attention also plays a role of magnifier in audio attention model.

Speech and Music Attention Models

Besides some special sound effects, such as a laugh, whistle, or explosion, humans typically pay more attention to speech or music because speech and music are important cues of a scene in video. In general, music is used to emphasize the atmosphere of scenes in video. Hence a highlight scene is typically accompanied with music background. On the other hand, textual semantic information is generally conveyed by speech. For example, speech rather than music is generally considered to be more important to a TV news audience.

Additionally, an audience typically pays more attention to salient speech or music segments if they are retrieving video clips with speech or music. The saliency of speech or music can be measured by the ratio of speech or music to other sounds in an audio segment. Music and speech ratio can be calculated with the following steps. First, an audio stream is segmented into sub-segments. Then, a set of features are computed from each sub-segment. The features include mel-frequency cepstral coefficients (MFCCs), short time energy (STE), zero crossing rates (ZCR), sub-band powers distribution, brightness, bandwidth, spectrum flux (SF), linear spectrum pair (LSP) divergence distance, band periodicity (BP), and the pitched ratio (ratio between the number of pitched frames and the total number of frames in a sub-clip). Support vector machine is finally used to classify each audio sub-segment into speech, music, silence, and others.

With the results of classification, speech ratio and music ratio of a sub-segment are computed as follows.

$$M_{speech} = N^{w}_{speech} / N^{w}_{total} \quad (17)$$

$$M_{music} = N^{w}_{music} / N^{w}_{total} \quad (18)$$

where $M_{speech}$ and $M_{music}$ denote speech attention and music attention model, respectively. $N^{w}_{speech}$ is the number of speech sub-segments, and $N^{w}_{music}$ is the number of music sub-segments. The total number of sub-segments in an audio segment is denoted by $N^{w}_{total}$.

The comprehensive user attention model 204 of FIG. 2 provides a new way to model viewer attention in viewing video. In particular, this user attention model identifies patterns of viewer attention in a video data sequence with respect to multiple integrated visual, audio, and linguistic attention model criteria, including static and dynamic video modeling criteria. In light of this, the comprehensive user attention model is a substantially useful tool for many tasks that require computational analysis of a video data sequence.

A Procedure to Generate a Comprehensive User Attention Model

Figure 17:
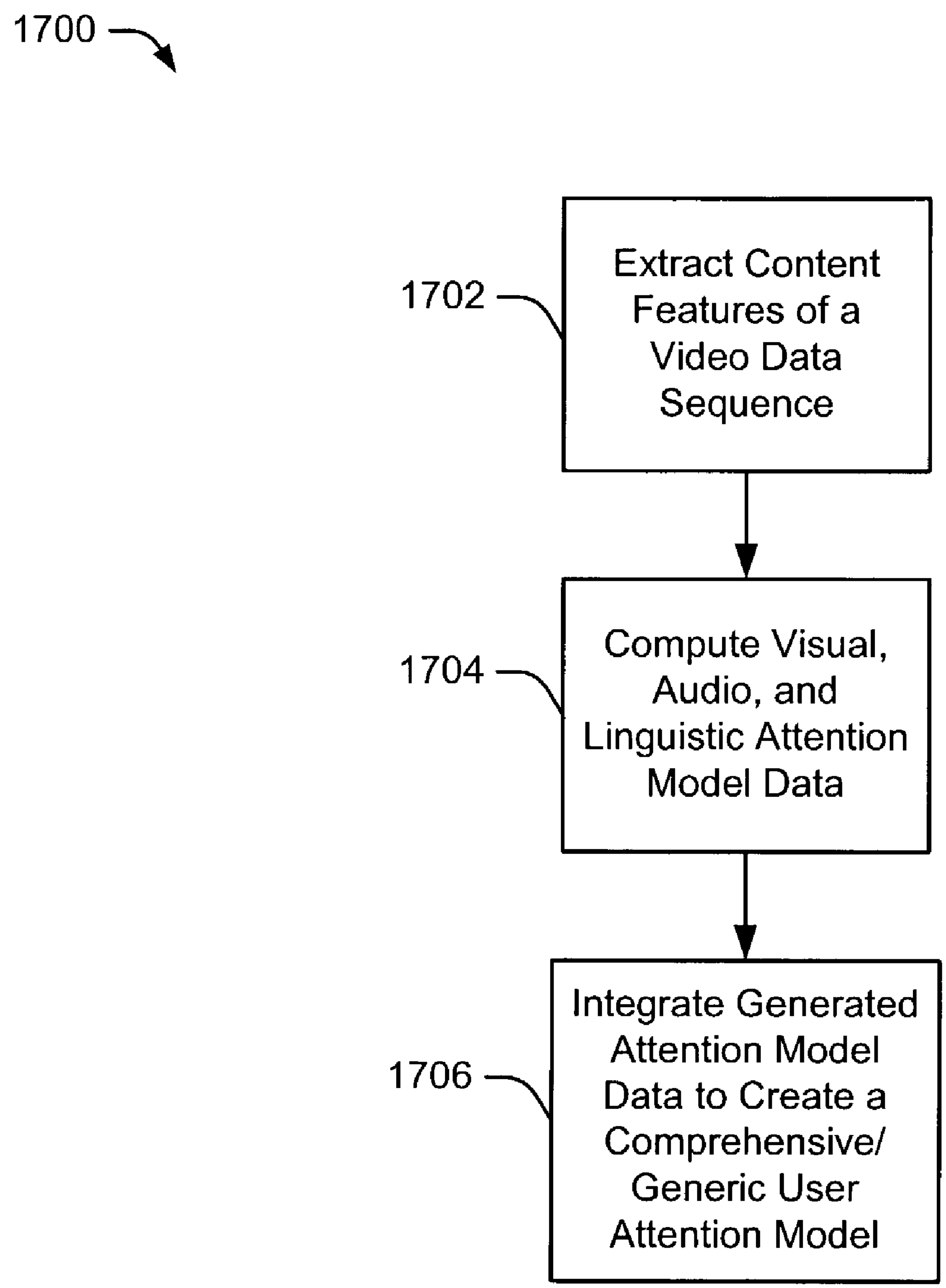
FIG. 17 is a flow diagram showing an exemplary procedure to generate a comprehensive user attention model for attention analysis of a video data sequence.

FIG. 17 is a flow diagram showing an exemplary procedure 1700 to generate a comprehensive user attention model for computational analysis of a video data sequence. The comprehensive user attention model is an integration of data generated from applying multiple different visual, audio, and linguistic attention models, including static and dynamic skimming models, to an original video data sequence. Exemplary systems and methods for generation of a comprehensive user attention model are discussed above with respect to FIGS. 1-16. For purposes of discussion, the operations of FIG. 17 are discussed while referring to elements of FIG. 2.

At block 1702, visual, audio, and linguistic features such as image sequence, motion, color, shape, sound, text, and so on, are extracted from a video data sequence. For example, video component extraction module 208 of FIG. 2 extracts video features as extracted video components 214. At block 1704, the extracted components are analyzed with multiple visual, audio, and linguistic attention models to generate attention model data. Such attention models are based on visual, audio, and linguistic attention models. The applied attention models include, for example, static and dynamic skimming attention models. For example, video attention modeling module 216 of FIG. 2 generates attention data 222 using multiple visual, audio, and linguistic attention modeling modules 216-220.

At block 1706, a comprehensive or generic user attention curve is generated via linear combination of the generated attention model data. For example, integration module 212 of FIG. 2 generates comprehensive user attention model 204 via linear combination of the computed attention data 222. Exemplary procedures to perform such linear combination were described above in reference to FIG. 2. In this manner, the comprehensive user attention model that is based on multiple integrated visual, audio, and linguistic attention models is generated.

Conclusion

The described systems and methods generate a comprehensive user attention model for use in video data analysis. The comprehensive user attention model is generic in that it can be applied to numerous video data analysis applications. For example, an exemplary application of the comprehensive user attention model is described with respect to exemplary systems and methods for dynamic generation of a video summary. Additionally, the comprehensive video attention model is extensible in that different combinations of available attention models can be integrated to generate the resulting comprehensive model.

Although the systems and methods to generate a comprehensive user attention model for video data analysis have been described in language specific to structural features and methodological operations, the subject matter as defined in the appended claims are not necessarily limited to the specific features or operations described. Rather, the specific features and operations are disclosed as exemplary forms of implementing the claimed subject matter.

The invention claimed is:

1. A computer-implemented method for generating a comprehensive user attention model, the method comprising
- extracting feature components from a video data sequence:
- generating attention data based on application of multiple attention models to the feature components;
- integrating the attention data to create the comprehensive user attention model; and
- wherein the comprehensive user attention model is represented as:

$$A = w_v \cdot \overline{M_v} + w_a \cdot \overline{M_a} + w_l \cdot \overline{M_l},$$

$w_v$, $w_a$, $w_l$ representing weights for linear combination, and $\overline{M_v}$, $\overline{M_a}$, and $\overline{M_l}$ indicating normalized visual, audio, and linguistic attention models.

2. The method of claim 1, wherein the feature components comprise image sequence, audio, and textual components.

3. The method of claim 1, wherein the multiple attention models comprise a combination of visual, audio, and/or linguistic attention models.

4. The method of claim 1, wherein the multiple attention models comprise a combination of static and dynamic attention models.

5. The method of claim 1, wherein the multiple attention models comprise motion, static, face, and/or camera attention models.

6. The method of claim 1, wherein the multiple attention models comprise saliency, speech, and/or music attention models.

7. The method of claim 1, wherein the multiple attention models comprise closed caption, and/or automated speech recognition attention models.

8. The method of claim 1, wherein integrating the attention data ifirther comprises integrating the attention data via linear combination.

9. The method of claim 1, wherein $\overline{M_l}$, $\overline{M_a}$, and $\overline{M_l}$ are defined as follows:

$$M_v = \left(\sum_{i=1}^{p} w_i \cdot \overline{M_i}\right) \times (\overline{M}_{cm})^{S_{cm}};$$

$$M_a = \left(\sum_{j=1}^{q} w_j \cdot \overline{M_j}\right) \times (\overline{M}_{as})^{S_{as}};$$

$$M_l = \sum_{k=1}^{r} w_k \cdot \overline{M_k}\text{ ; and}$$

wherein $w_i$, $w_j$, $w_k$ are weights in visual, audio, and linguistic attention models respectively, wherein $\overline{M_{cm}}$ comprises a normalized camera attention used as a visual attention model magnifier, and wherein $S_{cm}$ comprises a magnifier switch that is based on multiple criteria.

10. The method of claim 9, wherein the multiple criteria comprise:

if $S_{cm}$>=1, the magnifier is turned on;

if $S_{cm}$=0, the magnifier is turned off; and wherein a large $S_{cm}$ value indicates a more powerful magnifier than a low $S_{cm}$ value.

11. A computer-implemented method for generating a comprehensive user attention model, the method comprising extracting feature components from a video data sequence;

generating attention data based on application of multiple attention models to the feature components;

integrating the attention data to create the comprehensive user attention model; and wherein the multiple attention models comprise a camera attention model and one or more other visual attention models, and wherein generating the attention data further comprises multiplying a sum of the one or more other visual attention models by quantized factors to determine emphasis of the camera attention model with respect to the other visual attention model(s), the quantized factors being camera attention factors.

12. The method of claim claim 11, wherein quantized factor values range from zero (0) to two (2).

13. A tangible computer-readable medium storing computer-executable instructions executable by a processor to generate an attention model, the computer-executable instructions comprising instructions for:

extracting feature components from a video data sequence;

generating attention data based on application of at least visual and audio attention models to the feature components;

linearly combining the attention data to generate a generic user attention model that integrates results of the multiple visual, audio, and linguistic attention models; and wherein the generic user attention model is represented as:

$$A=w_v \cdot \overline{M_v}+w_a \cdot \overline{M_a}+w_l \cdot \overline{M_l},$$

$w_v$, $w_a$, $w_l$ representing weights for linear combination, and wherein $\overline{M_v}$, $\overline{M_a}$, and $\overline{M_l}$ represent normalized visual, audio, and linguistic attention models.

14. The computer-readable medium of claim 13, wherein generating attention data is further based on application of a linguistic attention model to one or more portions of the feature components.

15. The computer-readable medium of claim 13, wherein the feature components comprise image sequence, audio, and textual components.

16. The computer-readable medium of claim 13, wherein the audio attention models comprise saliency, speech, and/or music attention models.

17. The computer-readable medium of claim 13, wherein the linguistic attention models comprise closed caption, and/or automated speech recognition attention models.

18. The computer-readable medium of claim 13, wherein $\overline{M_v}$, $\overline{M_a}$, and $\overline{M_l}$ are defined as follows:

$$M_v = \left(\sum_{i=1}^{p} w_i \cdot \overline{M_i}\right) \times (\overline{M}_{cm})^{S_{cm}},$$

$$M_a = \left(\sum_{j=1}^{q} w_j \cdot \overline{M_j}\right) \times (\overline{M}_{as})^{S_{as}},$$

$$M_l = \sum_{k=1}^{r} w_k \cdot \overline{M_k},$$

$w_i$, $w_j$, $w_k$ being weighted values of visual, audio, and linguistic attention models respectively, $\overline{M_{cm}}$ representing a normalized camera attention used as a visual attention model magnifier, and $S_{cm}$ identifying a magnifier switch tat is based on multiple criteria.

19. The computer-readable medium of claim 18, wherein the multiple criteria comprise:

if $S_{cm}$>=1, the magnifier is turned on;

if $S_{cm}$=0, the magnifier is turned off; and wherein a large $S_{cm}$ value indicates a more powerful magnifier than a low $S_{cm}$ value.

20. The computer-readable medium of claim 13, wherein the visual attention models comprise motion, static, face, and/or camera attention models.

21. The computer-readable medium of claim 20, wherein the camera attention model is based at least in part on the following criteria:

during camera zooming operations, frame importance increases temporally and is a function of zooming speed such that a first frame generated during a fast zooming operation is of higher relative importance that a second frame generated during a slower zooming operation; and during camera panning operations, frame importance is an inverse of panning speed and a function of panning direction.

22. The computer-readable medium of claim 21, wherein frames generated during a horizontal camera panning operation are calculated to be of lesser relative importance as compared to frames generated during a vertical panning operation.

23. The computer-readable medium of claim 21, wherein calculated importance of a frame generated during panning or zooming operations is reduced from a higher importance to a lower importance as a function of ending the panning or zooming operation and passage of a certain period of time.

24. A computing device for creating a comprehensive user attention model, the computing device comprising:

a processer;

a memory coupled to the processor the memory comprising computer-program instructions executable by the processor for:

generating visual, audio, and linguistic attention data based on application of multiple attention models to a plurality of video data sequence feature components, the feature components comprising image sequence, audio, and text-related features;

integrating the visual, audio, and linguistic attention data to create the comprehensive user attention model;

wherein the comprehensive user attention model is a computational representation of elements of the video data sequence tat attract user attention; and wherein the computational representation is defined as:

$$A=w_v\cdot\overline{M_v}+w_a\cdot\overline{M_a}+w_l\cdot\overline{M_l},$$

$w_v$, $W_a$, $w_l$ representing weights for linear combination, and wherein $\overline{M_v}$, $\overline{M_a}$, and $\overline{M_l}$ represent normalized visual, audio, and linguistic attention models.

25. The computing device of claim 24, wherein the computer-program instructions for generating further comprise instructions for creating the visual attention data with motion, static, face, and/or camera attention models.

26. The computing device of claim 24, wherein the computer-program instructions for generating further comprise instructions for creating the audio attention data with saliency, speech, and/or music attention models.

27. The computing device of claim 24, wherein the computer-program instructions for generating further comprise instructions for creating the linguistic attention data with closed caption, and/or automated speech recognition attention models.

28. The computing device of claim 24, wherein $\overline{M_v}$, $\overline{M_a}$, and $\overline{M_l}$ are defined as follows:

$$M_v=\left(\sum_{i=1}^{p} w_i\cdot\overline{M_i}\right)\times(\overline{M}_{cm})^{S_{cm}},$$

$$M_a=\left(\sum_{j=1}^{q} w_j\cdot\overline{M_j}\right)\times(\overline{M}_{as})^{S_{as}},$$

$$M_l=\sum_{k=1}^{r} w_k\cdot\overline{M_k},$$

$w_i$, $w_j$, $w_k$ being weighted values of visual, audio, and linguistic attention models respectively, $\overline{M_{cm}}$ representing a normalized camera attention used as a visual attention model magnifier, and $S_{cm}$ identifying a magnifier switch that is based on multiple criteria.

29. The computing device of claim 28, wherein the multiple criteria comprise:

if $S_{cm}>=1$, the magnifier is open;

if $S_{cm}=0$, the magnifier is closed; and wherein a large $S_{cm}$ value indicates a more powerful magnifier than a low $S_{cm}$ value.

30. The computing device of claim 24, wherein the multiple attention models comprise a camera attention model, and wherein the computer-program instructions for generating the visual attention data generate camera attention data based at least in part on the following criteria:

during camera zooming operations, frame importance increases temporally and is a function of zooming speed such that a first frame generated during a fast zooming operation is of higher relative importance that a second frame generated during a slower zooming operation; and during camera panning operations, frame importance is an inverse of panning speed and a function of panning direction.

31. The computing device of claim 30, wherein frames generated during a horizontal camera panning operation are calculated to be of lesser relative importance as compared to frames generated during a vertical panning operation.

32. The computing device of claim 30, wherein calculated importance of a frame generated during panning or zooming operations is reduced from a higher importance to a lower importance as a function of ending the panning or zooming operation and passage of a certain period of time.

* * * * *

UNITED STATES PATENT AND TRADEMARK OFFICE

CERTIFICATE OF CORRECTION

PATENT NO. : 7,274,741 B2
APPLICATION NO. : 10/286053
DATED : September 25, 2007
INVENTOR(S) : Yu-Fei Ma et al.

It is certified that error appears in the above-identified patent and that said Letters Patent is hereby corrected as shown below:

Column 1, line 8, change "10/286,933" to -- 10/285,933 --.

Signed and Sealed this

Twenty-sixth Day of August, 2008

JON W. DUDAS
*Director of the United States Patent and Trademark Office*